US012264058B2

(12) United States Patent
Song

(10) Patent No.: US 12,264,058 B2
(45) Date of Patent: Apr. 1, 2025

(54) SEPARATE TYPE ELECTRIC WINE DISPENSER AND PRESERVER

(71) Applicant: ZHUHAI CHEER TECHNOLOGY CO., LTD., Guangdong (CN)

(72) Inventor: Xiaoxian Song, Guangdong (CN)

(73) Assignee: Zhuhai Cheer Technology Co., Ltd., Zhuhai (CN)

( * ) Notice: Subject to any disclaimer, the term of this patent is extended or adjusted under 35 U.S.C. 154(b) by 209 days.

(21) Appl. No.: 18/052,368

(22) Filed: Nov. 3, 2022

(65) Prior Publication Data

US 2024/0034610 A1 Feb. 1, 2024

(30) Foreign Application Priority Data

Jul. 29, 2022 (CN) ......................... 202221983007.6

(51) Int. Cl.
*B67D 1/04* (2006.01)

(52) U.S. Cl.
CPC .................................. *B67D 1/0431* (2013.01)

(58) Field of Classification Search
CPC .. B67D 1/0004; B67D 1/0431; B67D 1/0888; B67D 1/0885; B67D 2001/0493; B67D 1/0802; B67D 2001/0098; B67D 1/0425; B05B 9/043; B05B 9/0426; B05B 9/0811; B01F 2101/17
See application file for complete search history.

(56) References Cited

U.S. PATENT DOCUMENTS

| | | | | |
|---|---|---|---|---|
| 7,882,986 | B2 * | 2/2011 | Huang | F04B 45/047 222/333 |
| 9,051,167 | B2 * | 6/2015 | Burge | B67D 1/0831 |
| 9,862,590 | B2 * | 1/2018 | Chung | B67D 1/10 |
| 10,618,705 | B1 * | 4/2020 | Laible | B05B 1/14 |
| 10,710,866 | B2 * | 7/2020 | Zhu | B01F 23/23413 |
| 11,286,146 | B2 * | 3/2022 | Taylor | B67D 1/0888 |
| 2015/0367295 | A1 * | 12/2015 | Okumura | F04B 35/04 99/323.1 |
| 2021/0323012 | A1 * | 10/2021 | Chung | B67D 1/0004 |

FOREIGN PATENT DOCUMENTS

| | | | |
|---|---|---|---|
| CN | 210505543 | U | 5/2020 |
| FR | 3036697 | A1 * | 12/2016 |

* cited by examiner

*Primary Examiner* — Donnell A Long

(57) ABSTRACT

The application discloses a separate type electric wine dispenser and preserver, including: a wine dispensing main unit and a stopper component. The lower part of the wine dispensing main unit is provided with a connector. A liquid guide chamber and an air guide chamber are arranged in the connector. The upper part of the stopper component is provided with a stopper valve. The upper part of the stopper valve is provided with an air inlet hole and a liquid guide hole protruding out of the stopper valve. The air inlet hole corresponds to the air guide chamber in position. The liquid guide hole is inserted in the liquid guide chamber. After wine dispensing, the separate type electric wine dispenser and preserver can seal a bottle for preservation by simply removing the wine dispensing main unit while the stopper component remains being kept on the bottle.

9 Claims, 12 Drawing Sheets

SEPARATE TYPE ELECTRIC WINE DISPENSER AND PRESERVER

CROSS REFERENCE TO RELATED APPLICATIONS

The present application claims the benefit of Chinese Patent Application No. 202221983007.6 filed on Jul. 29, 2022, the contents of which are incorporated herein by reference in their entirety.

TECHNICAL FIELD

The application relates to the technical field of wine sets, in particular to a separate type electric wine dispenser and preserver.

BACKGROUND

When drinking wine, the wine may be directly poured from a bottle. Besides, a wine dispenser is also a common tool for people. Existing wine dispensers include manual wine dispensers and electric wine dispensers.

The Chinese application patent of which the application number is No. 201921331990.1 discloses an electronic wine dispenser, including: an electronic switch, a shell, and a pressurization component and a pressure relief mechanism which are arranged in the shell. The shell is provided with an air inlet channel and a wine outlet channel. The pressurization component includes a motor and a pressurizer. The pressurizer communicates with the air inlet channel. The pressure relief mechanism is provided with an electric valve. The electric valve communicates with the air inlet channel. The electric valve may also communicate with the outside atmosphere at the same time. When the electronic switch is turned on, the electric valve is isolated from the outside atmosphere, and the pressurizer discharges the wine by controlling the air pressure in the bottle. When the electronic switch is turned off, the electric valve communicates with the outside atmosphere, thereby relieving the air pressure in the bottle. According to the application, the electric valve is used as an air reliever instead of a traditional mechanical air relief structure, thus optimizing the internal structure of the wine dispenser and greatly improving the use experience.

However, the above-mentioned electric wine dispenser can only perform wine dispensing, but cannot seal the bottle for preservation. When the wine in the bottle is not finished and the bottle needs to be sealed for preservation, one must take down the electric wine dispenser from the bottle and seal the neck of the bottle with a sealing stopper. When the wine needs to be dispensed for drinking next time, the sealing stopper should be taken down, and the electric wine dispenser should be mounted. Therefore, the operation is inconvenient. Besides, since multiple replacement operations occur at the neck of the bottle, the bottle is liable to bacterial infection.

SUMMARY

In order to solve the technical problem of resealing a bottle for preservation after an electric wine dispenser is removed, the application provides a separate type electric wine dispenser and preserver. After wine dispensing, the separate type electric wine dispenser and preserver can seal the bottle for preservation by simply removing a wine dispensing main unit while a stopper component remains being kept on the bottle.

The application is specifically implemented according to the following technical solutions:

A separate type electric wine dispenser and preserver includes a wine dispensing main unit and a stopper component. The lower part of the wine dispensing main unit is provided with a connector. A liquid guide chamber and an air guide chamber are arranged in the connector. The upper part of the stopper component is provided with a stopper valve. The upper part of the stopper valve is provided with an air inlet hole and a liquid guide hole protruding out of the stopper valve. The air inlet hole corresponds to the air guide chamber in position. The liquid guide hole is inserted in the liquid guide chamber.

Through the cooperation between the air inlet hole and the air guide chamber as well as between the air guide hole and the liquid guide chamber, the wine dispensing main unit can be matched with and removed from the stopper component. When the wine does not need to be dispensed, the wine dispensing main unit can be taken down while the stopper component remains being kept at the opening of the bottle, thereby realizing the purpose of sealing the bottle for preservation.

Further, the outer wall of the connector is provided with a connection groove. The connection groove has a groove opening. The stopper component is provided with snap-fit points. The snap-fit points are inlaid into or detached from the connection groove through the groove opening. The connection groove cooperates with the snap-fit points, so that the cooperation between the wine dispensing main unit and the stopper component is closer, and the operation is more stable and convenient.

Further, the wine dispensing main unit further includes a main unit shell component, a switch component, a circuit component, a pressurization component, a liquid outlet component and an air guide tube. The switch component is arranged on the surface of the main unit shell component. The circuit component, the pressurization component, the liquid outlet component and the air guide tube are arranged inside the main unit shell component. The switch component, the circuit component and the pressurization component are electrically connected. The pressurization component communicates with the air guide tube. The upper part of the connector is provided with a liquid guide port and an air guide port. One end of the liquid guide port is connected with the liquid outlet component, and the other end communicates with the liquid guide chamber. One end of the air guide port is connected with the air guide tube, and the other end communicates with the air guide chamber.

Furthermore, the liquid guide chamber is positioned at one side of the air guide chamber.

Furthermore, the liquid outlet component includes a liquid outlet tube and a liquid guide tube. The liquid guide tube is a hose. The liquid outlet tube is connected with one end of the liquid guide tube, and the other end of the liquid guide tube is connected with the liquid guide port.

Furthermore, the air guide tube is a hose.

The liquid guide tube and the air guide tube are arranged as hoses, so that the tubes can be mounted more easily, thereby greatly lowering the manufacturing and installation cost.

Furthermore, the main unit shell component includes an upper main unit body component and a lower main unit body component. The upper main unit body component has an upper main unit body opening. The liquid outlet tube is accommodated in the upper main unit body component. The opening of the liquid outlet tube protrudes out of the upper main unit body opening. The liquid outlet tube slightly protrudes out of the upper main unit body opening, thereby facilitating flow of the liquid from the wine dispensing main unit, preventing the liquid from entering the main unit shell component to influence the operation of circuits, and prolonging the service life of the main unit.

Further, the stopper component further includes a stopper shell component and a stopper valve positioning component. The shell component is further provided with a liquid guide channel and an air inlet channel. The stopper valve and the stopper valve positioning component are accommodated in the shell component. The stopper valve is positioned above the stopper valve positioning component. The stopper valve positioning component is fixed relative to the shell component. The stopper valve is rotatable relative to the stopper valve positioning component. The stopper valve positioning component is provided with a liquid guide through hole corresponding to the liquid guide channel and an air inlet through hole corresponding to the air inlet channel.

The stopper valve is rotatable relative to the stopper positioning component, so that when the snap-fit points are rotated to the inside of the groove while the wine dispensing main unit is rotated, the air inlet hole and the air inlet through hole communicate with each other, the liquid guide hole and the liquid guide through hole communicate with each other, and the stopper component is in an OPEN state; and if an opened bottle of wine needs to be sealed, it is only required to rotate the wine dispensing main unit again and rotate the stopper valve to make the snap-fit points detach from the groove opening, at this time, the air inlet hole and the air inlet through hole are staggered with each other, the liquid guide hole and the liquid guide through hole are staggered with each other, and the stopper component is in a CLOSE state, thereby sealing the bottle of wine.

Furthermore, the stopper shell component includes an upper stopper shell and a lower stopper shell. The snap-fit points are arranged on the upper stopper shell. The liquid guide channel and the air inlet channel are arranged on the lower stopper shell.

Further, the stopper valve positioning component includes a positioning piece and a sealing gasket. The positioning piece is provided with a positioning through hole. The sealing gasket is provided with the liquid guide through hole and the air inlet through hole.

Furthermore, the stopper valve is provided with an OPEN positioning concave point, a CLOSE positioning concave point, an OPEN positioning plane and a CLOSE positioning plane. An elastic rib, an OPEN contraposition plane and a CLOSE contraposition plane are arranged inside the positioning piece. When the elastic rib is accommodated in the OPEN positioning concave point, the OPEN contraposition plane abuts against the OPEN positioning plane, the air inlet hole and the air inlet through hole communicate with each other, the liquid guide hole and the liquid guide through hole communicate with each other, and the stopper component is in an OPEN state. When the elastic rib is accommodated in the CLOSE positioning concave point, the CLOSE contraposition plane abuts against the CLOSE positioning plane, the air inlet hole and the air inlet through hole are staggered with each other, the liquid guide hole and the liquid guide through hole are staggered with each other, and the stopper component is in a CLOSE state. Whenever the elastic rib cooperates with the OPEN positioning concave point or the CLOSE positioning concave point, a “snap” tone will be sent out, so that a user may easily distinguish whether the stopper component is in the OPEN state or the CLOSE state. At the same time, the OPEN positioning plane, the CLOSE positioning plane, the OPEN contraposition plane and the CLOSE contraposition plane are arranged, so that the rotation of the stopper valve is limited to a certain range, thereby preventing the user from over-rotating the stopper valve.

Furthermore, the top of the liquid guide hole is provided with a sealing ring. The outer wall of the liquid guide hole is provided with a stopper valve sealing ring. The arrangement of the sealing ring and the stopper valve sealing ring ensures that the stopper component can realize air/liquid-tight sealing.

Furthermore, the stopper component further includes a stopper sealing ring. The stopper sealing ring is nested at the outer side of the liquid guide channel and the air inlet channel. The stopper sealing ring enables the stopper component to remain sealed with the neck of the bottle when the stopper component is plugged into the neck of the bottle.

Furthermore, the stopper component further includes a long guide tube. The long guide tube is detachably connected with the liquid guide channel. When the wine needs to be dispensed, it is only required to connect the long guide tube with the liquid guide channel and place the stopper component at the neck of the bottle to insert the long guide tube into the wine.

Furthermore, the long guide tube is further provided with a decanting tube. The decanting tube is detachably connected with the long guide tube and the liquid guide channel. The side face of the decanting tube is provided with an aerating hole. When a decanting function is needed, the decanting tube is connected with the long guide tube, so that the aerating hole communicates with air in the bottle to realize the decanting function.

Furthermore, the wine dispensing main unit has a main unit dust cover. The main unit dust cover is detachably connected to the lower part of the main unit shell component. The stopper component has a stopper dust cover. The stopper dust cover is detachably connected at the top of the stopper shell component.

For the separate type electric wine dispenser and preserver provided by the application, when wine needs to be dispensed, the stopper component can be in the OPEN state by simply rotating the wine dispensing main unit to be assembled with the stopper component together, and wine dispensing can be realized by turning on the wine dispensing main unit; and when the unfinished bottle of wine needs to be preserved, the stopper component can be in the CLOSE state by simply rotating the wine dispensing main unit to be removed from the stopper component.

BRIEF DESCRIPTION OF THE DRAWINGS

In order to more clearly illustrate the technical solutions in the embodiments of the application, the accompanying drawings used in the embodiments will be briefly described below. Obviously, the accompanying drawings in the following description are only some embodiments of the application, and those of ordinary skill in the art can obtain other accompanying drawings according to these drawings without creative efforts.

DETAILED DESCRIPTION

Figure 1:
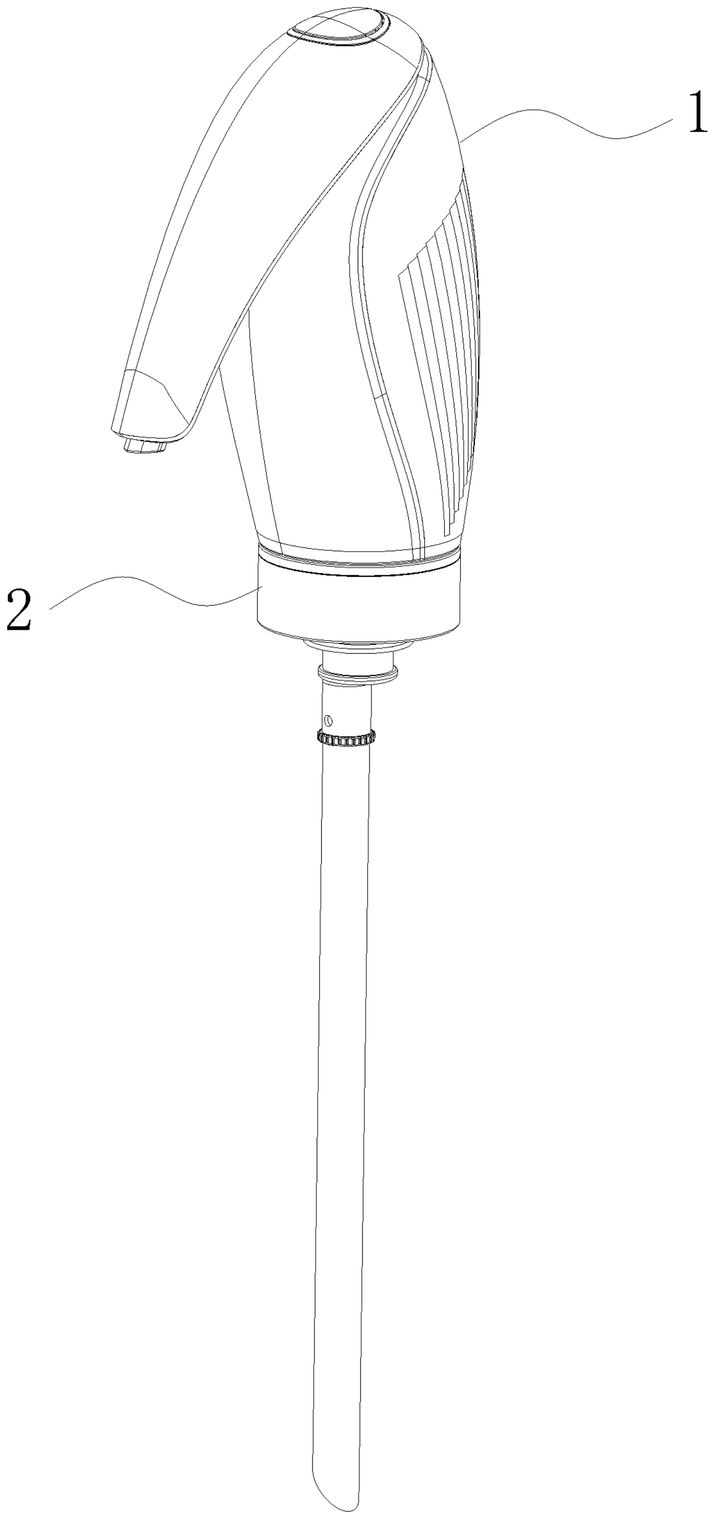
FIG. 1 is a three-dimensional view of an embodiment of the application.
Figure 2:
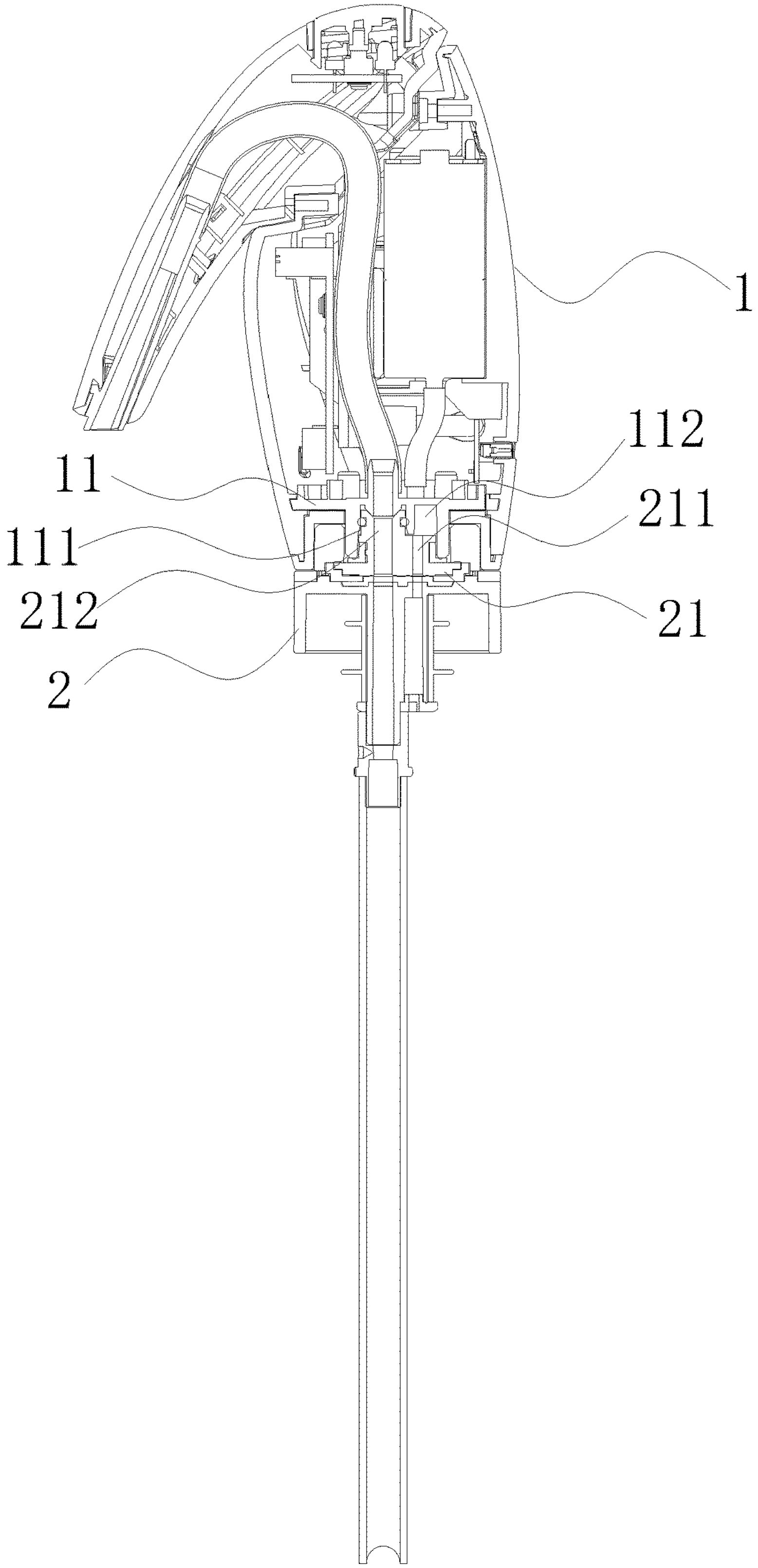
FIG. 2 is a sectional view of an embodiment of the application.

In order to make those skilled in the art better understand the solutions of the application, the technical solutions in the embodiments of the application will be clearly and completely described below in conjunction with the drawings in the embodiments of the application. It is apparent that the described embodiments are merely a part of the embodiments of the application, and not all of the embodiments. All other embodiments obtained by those of ordinary skill in the art based on the embodiments of the application without creative efforts are within the protection scope of the application.

"An embodiment" mentioned herein means that specific features, structures or characteristics described in conjunction with the embodiment may be included in at least one embodiment of the application. The phrase appearing at each position throughout the specification does not necessarily refer to the same embodiment, and does not refer to a separate or alternative embodiment that is mutually exclusive with other embodiments. As will be understood by those skilled in the art explicitly or implicitly, the embodiment described herein may be combined with other embodiments.

As shown in FIG. 1 to FIG. 4, a separate type electric wine dispenser and preserver includes a wine dispensing main unit 1 and a stopper component 2. The lower part of the wine dispensing main unit 1 is provided with a connector 11. A liquid guide chamber 111 and an air guide chamber 112 are arranged in the connector 11. The upper part of the stopper component 2 is provided with a stopper valve 21. The upper part of the stopper valve 21 is provided with an air inlet hole 211 and a liquid guide hole 212 protruding out of the stopper valve 21. The air inlet hole 211 corresponds to the air guide chamber 112. The liquid guide hole 212 is inserted in the liquid guide chamber 111.

Figure 3:
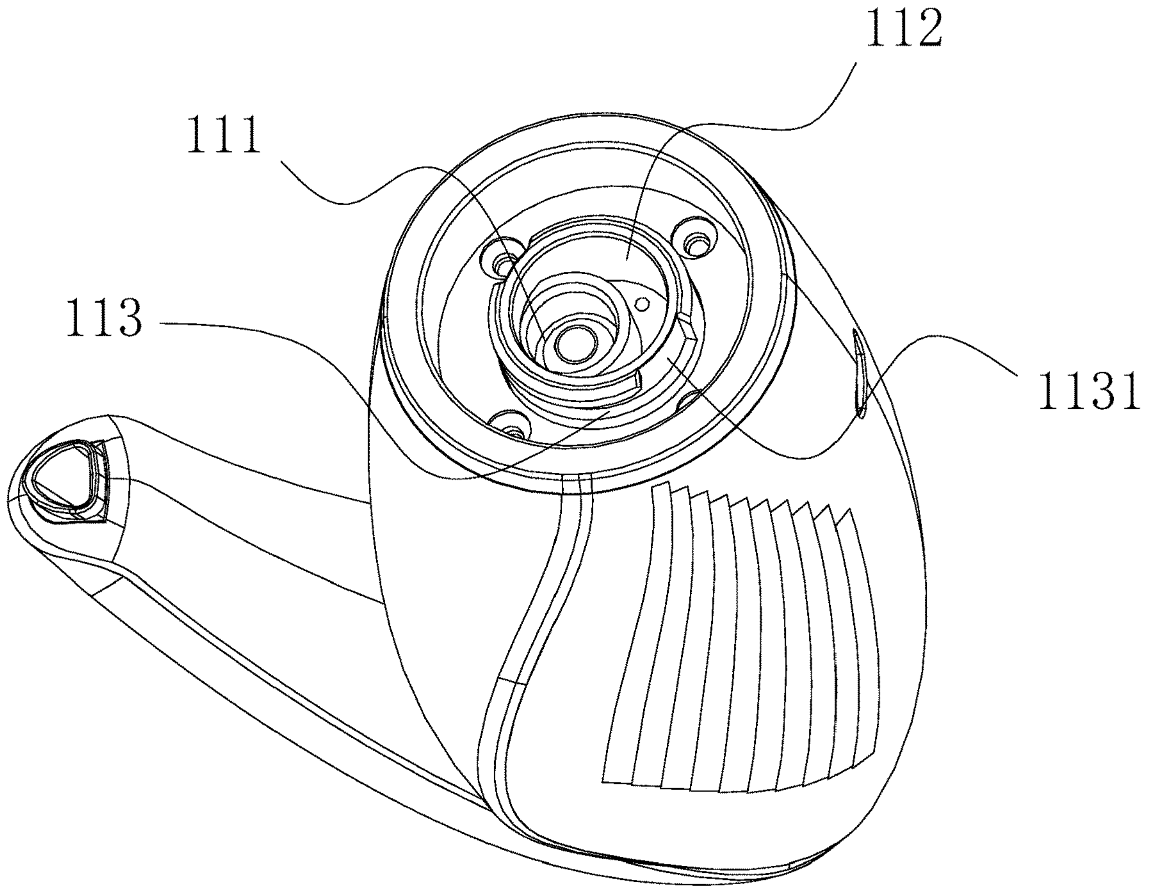
FIG. 3 is a three-dimensional view of a liquid dispensing main unit according to an embodiment of the application from another angle.
Figure 4:
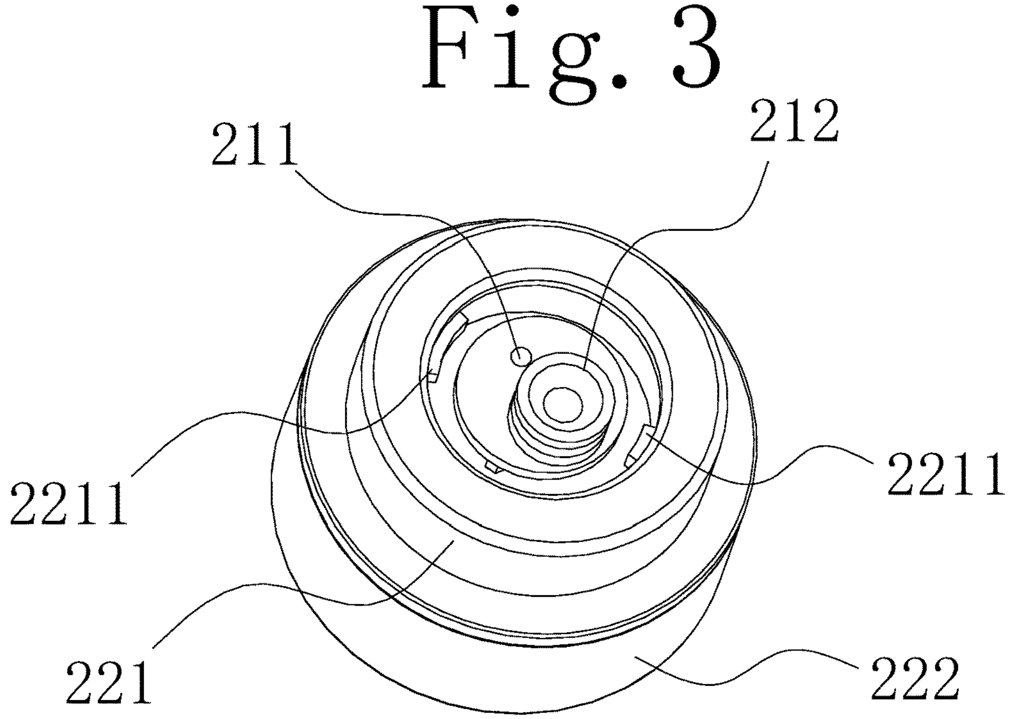
FIG. 4 is a three-dimensional view of a stopper component including no long guide tube according to an embodiment of the application from another angle.

As shown in FIG. 3 and FIG. 4, the outer wall of the connector 11 is provided with a connection groove 113. The connection groove 113 has a groove opening 1131. The stopper component 2 is provided with snap-fit points 2211. The snap-fit points 2211 are inlaid into or detached from the connection groove 113 through the groove opening 1131.

Figure 5:
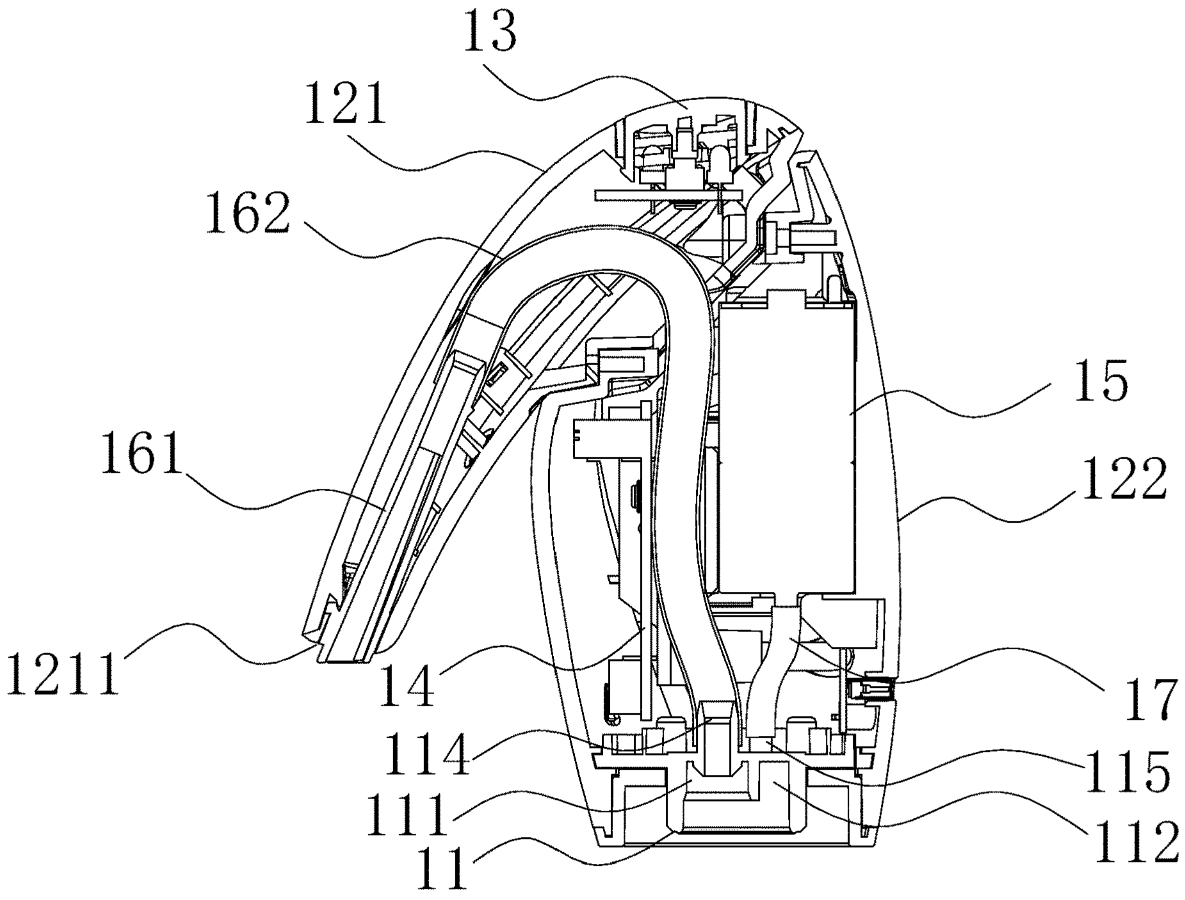
FIG. 5 is a sectional view of the liquid dispensing main unit according to an embodiment of the application.

As shown in FIG. 5, the wine dispensing main unit includes a main unit shell component, a switch component 13, a circuit component 14, a pressurization component 15, a liquid outlet component and an air guide tube 17. The main unit shell component includes an upper main unit body component 121 and a lower main unit body component 122. The upper main unit body component 121 has an upper main unit body opening 1211. The switch component 13 is arranged on the surface of the shell component. The liquid outlet component includes a liquid outlet tube 161 and a liquid guide tube 162. The liquid guide tube 162 is a hose. The liquid outlet tube 161 is accommodated in the upper main unit body component 121. The opening of the liquid outlet tube 161 protrudes out of the upper main unit body opening 1211. The air guide tube 17 is a hose. The circuit component 14, the pressurization component 15, the liquid outlet component and the air guide tube 17 are arranged inside the shell component. The switch component 13, the circuit component 14 and the pressurization component 15 are electrically connected. The pressurization component 15 communicates with the air guide tube 17. The lower part of the shell component is provided with a connector 11.

Figure 6:
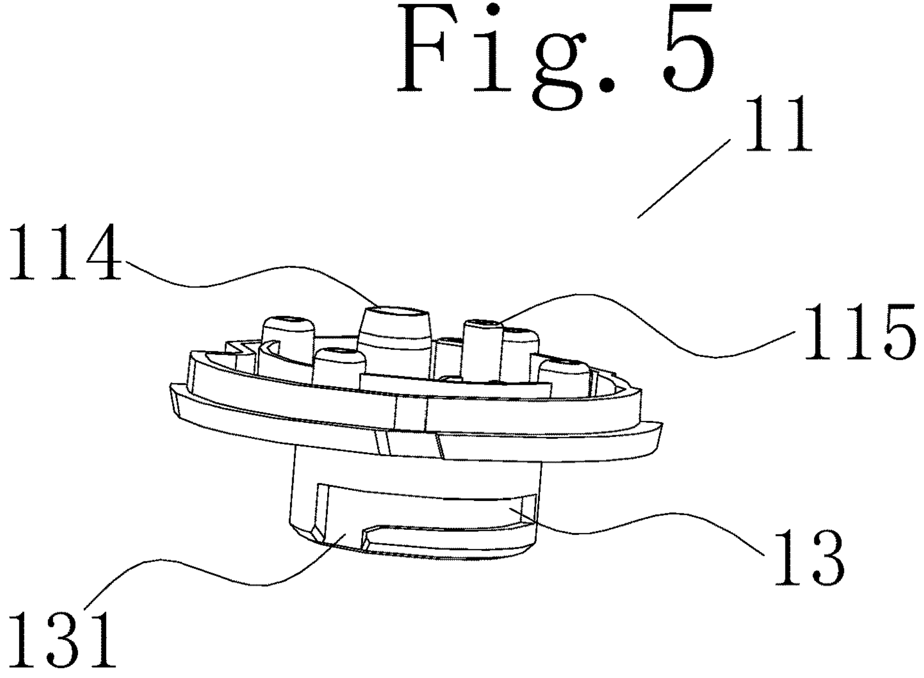
FIG. 6 is a three-dimensional view of a connector according to an embodiment of the application.

As shown in FIG. 5 and FIG. 6, the upper part of the connector 11 is provided with a liquid guide port 114 and an air guide port 115. The liquid guide port 114 is connected with one end of the liquid guide tube 162 of the liquid outlet component. The air guide port 115 is connected with one end of the air guide tube 17.

Figure 7:
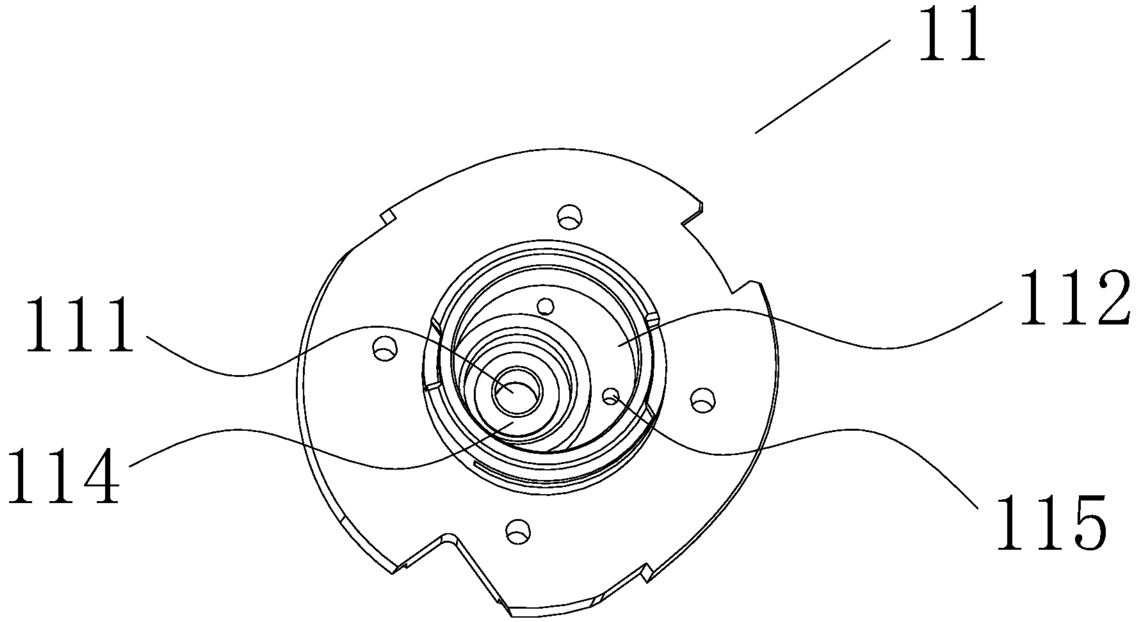
FIG. 7 is a three-dimensional view of the connector according to an embodiment of the application from another angle.
Figure 8:
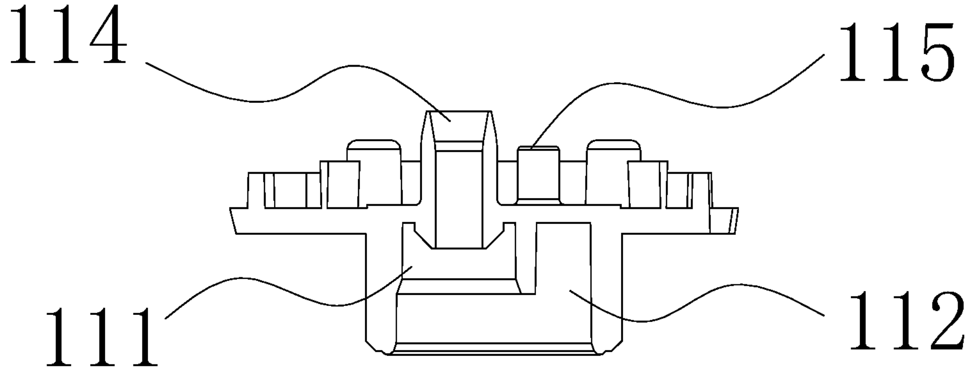
FIG. 8 is a sectional view of the connector according to an embodiment of the application.

As shown in FIG. 7 and FIG. 8, a liquid guide chamber 111 and an air guide chamber 112 are arranged inside the connector 11. The liquid guide port 114 communicates with the liquid guide chamber 111. The air guide port 115 communicates with the air guide chamber 112. The liquid guide chamber 111 is positioned at one side of the air guide chamber 112.

Figure 9:
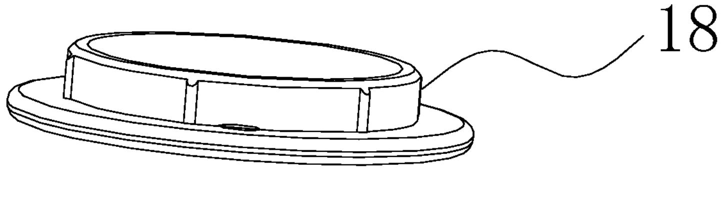
FIG. 9 is a three-dimensional view of a main unit dust cover according to an embodiment of the application.

As shown in FIG. 9, the wine dispensing main unit further has a main unit dust cover 18. The main unit dust cover 18 is detachably connected to the lower part of the main unit shell component.

Figure 10:
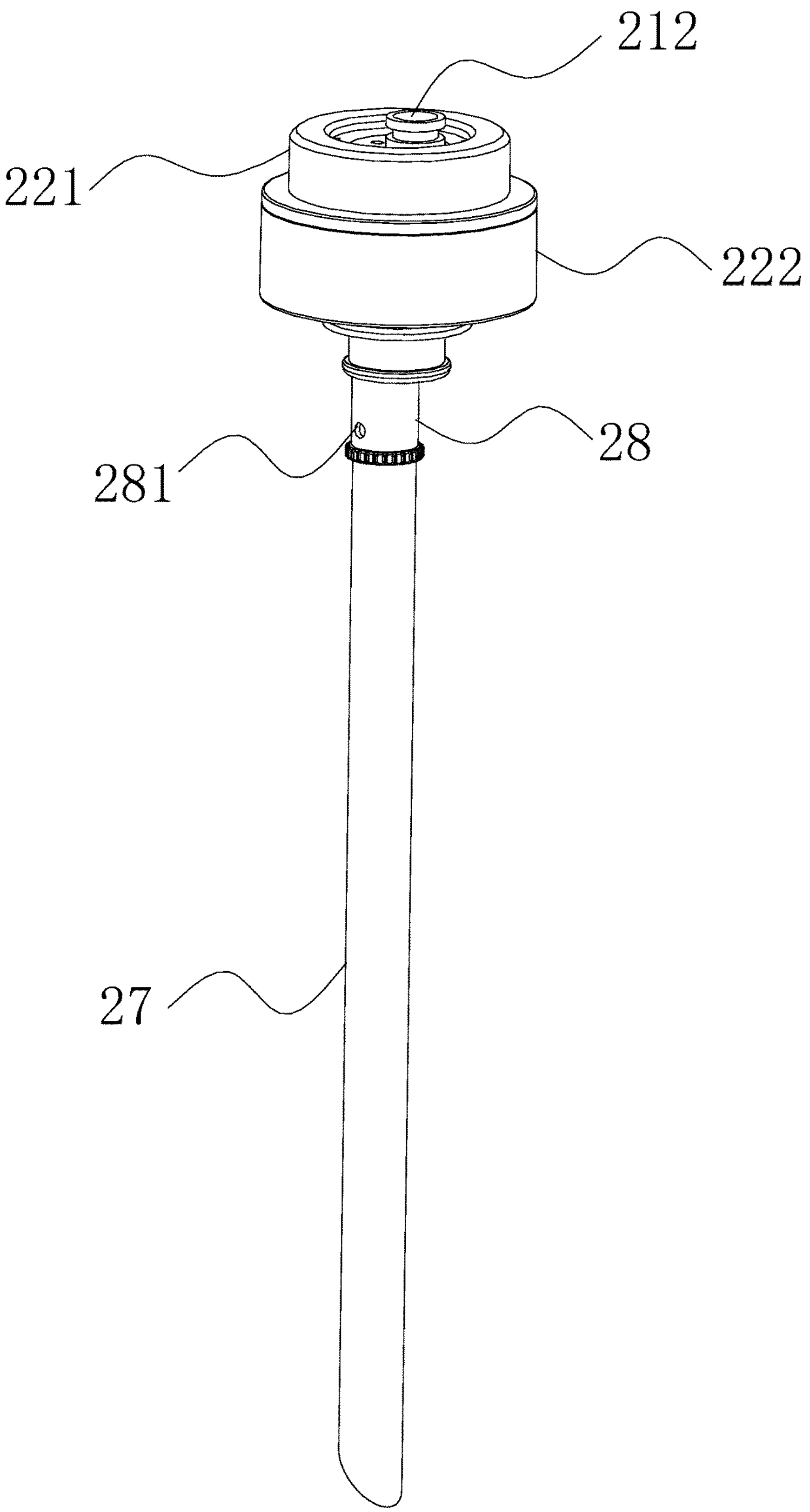
FIG. 10 is a three-dimensional view of the stopper component according to an embodiment of the application.
Figure 11:
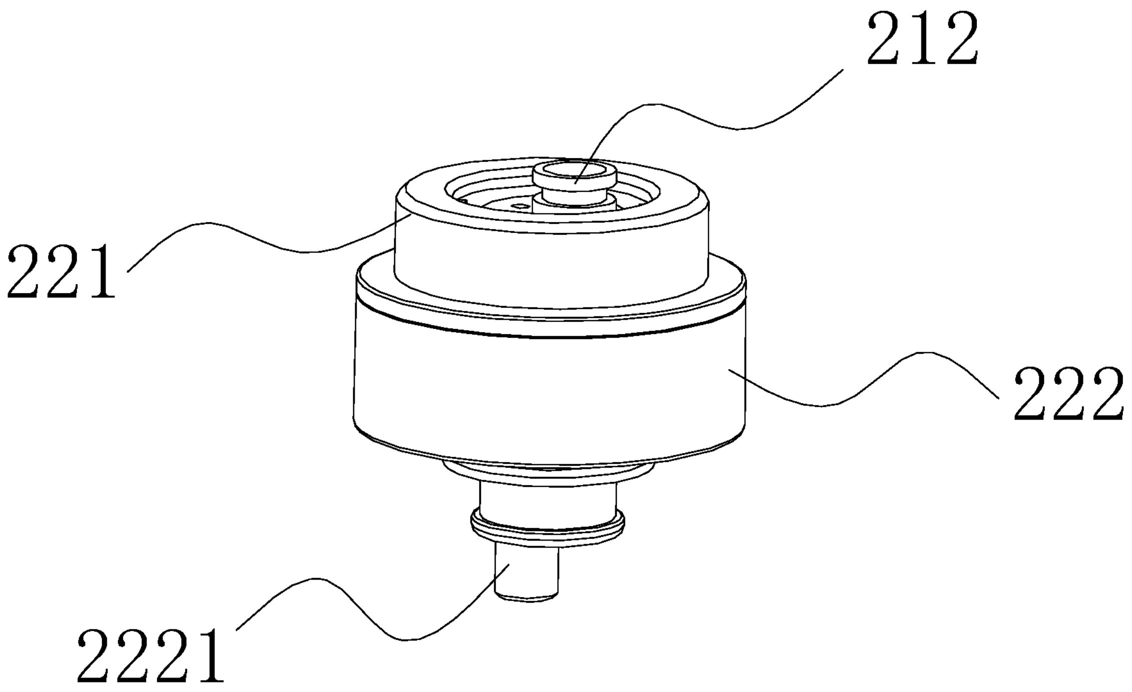
FIG. 11 is a three-dimensional view of the stopper component including no long guide tube according to an embodiment of the application.
Figure 12:
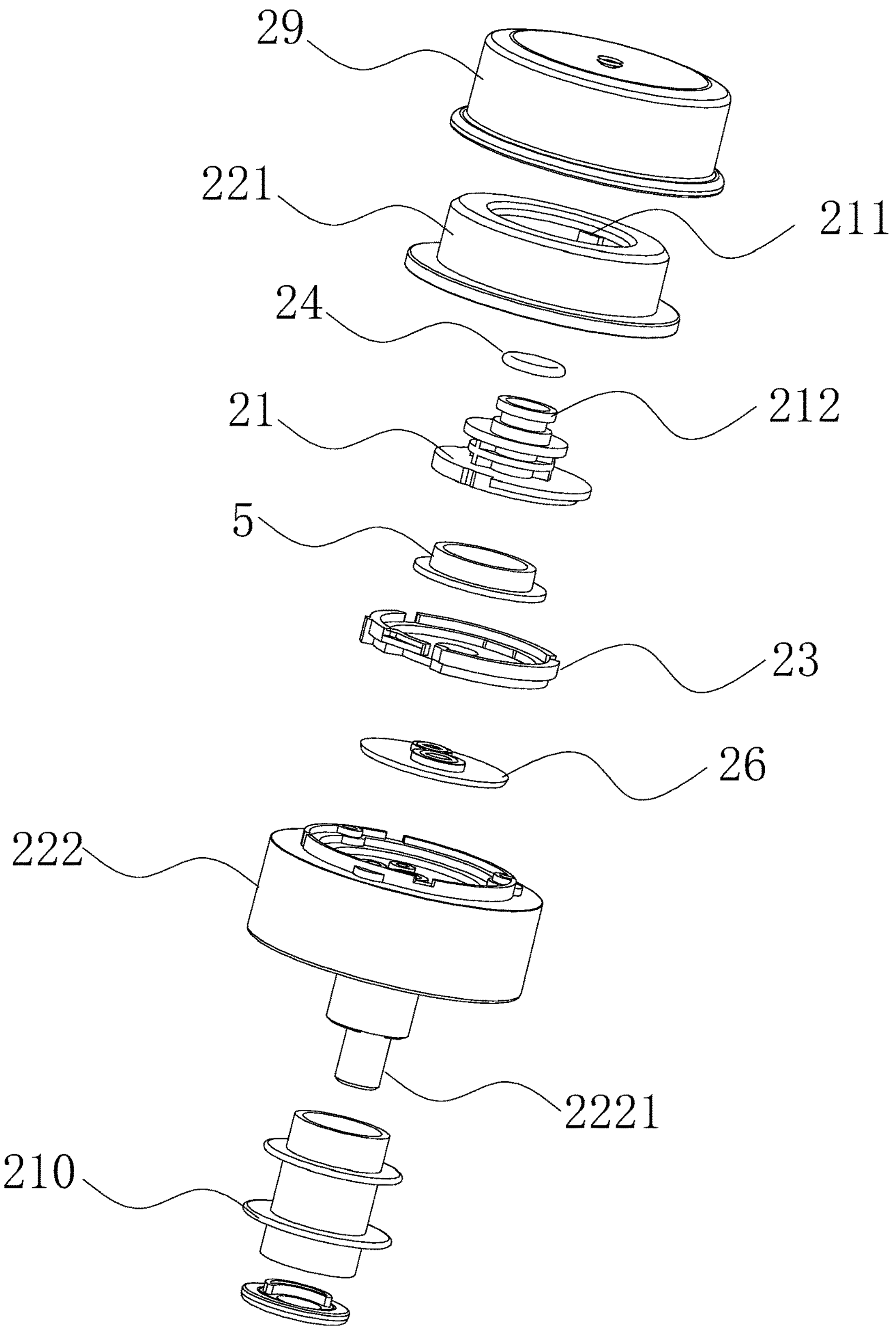
FIG. 12 is a exploded view of the stopper component including no long guide tube according to an embodiment of the application.
Figure 13:
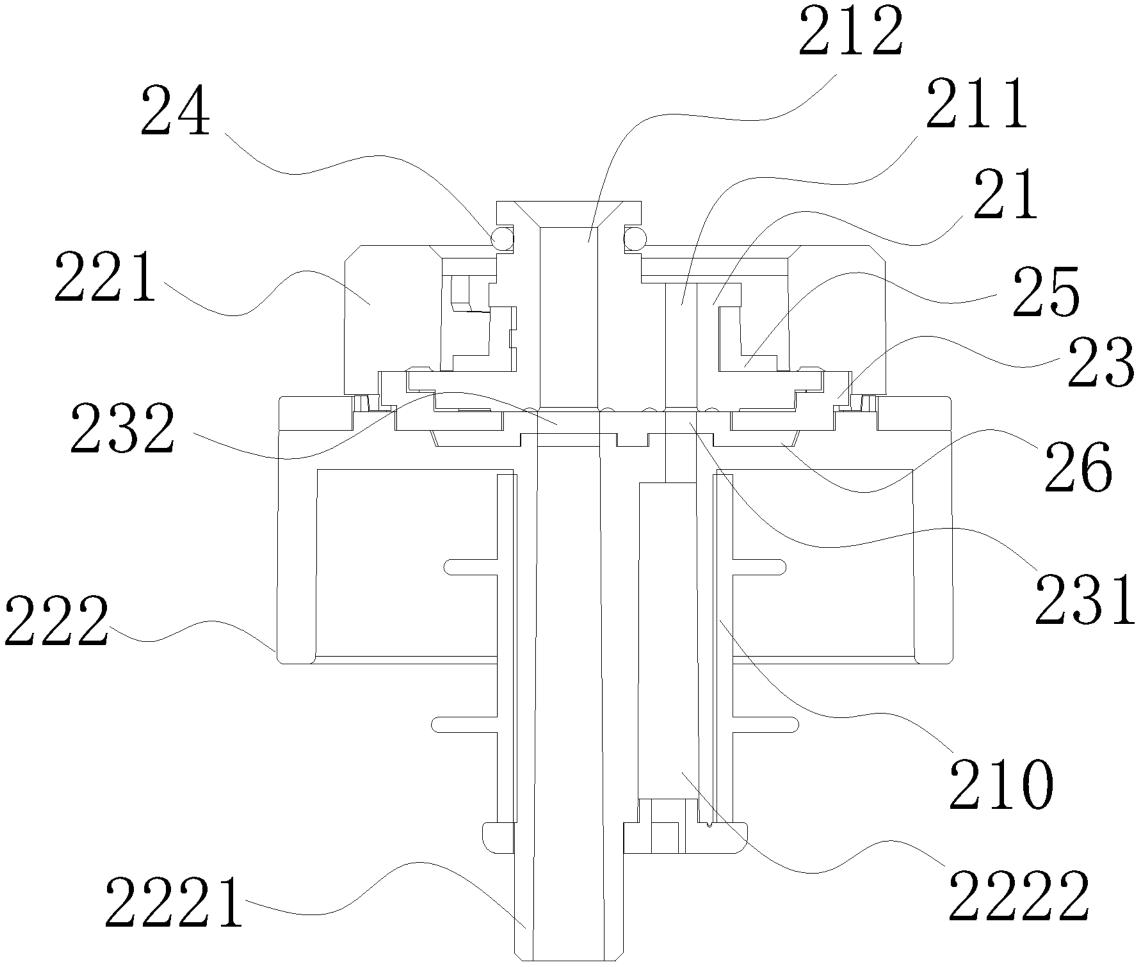
FIG. 13 is a sectional view of the stopper component according to an embodiment of the application in an OPEN state.
Figure 14:
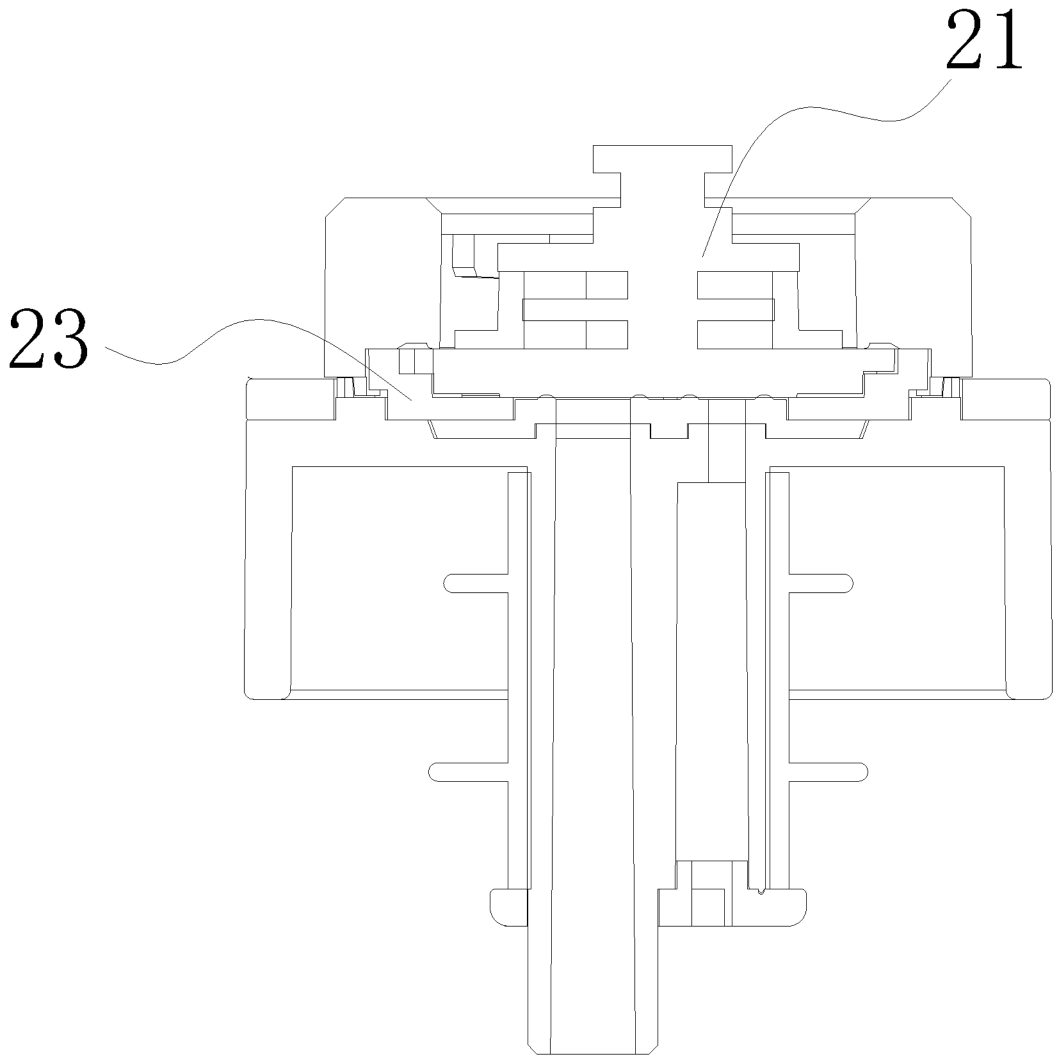
FIG. 14 is a sectional view of the stopper component according to an embodiment of the application in a CLOSE state.

As shown in FIG. 3, FIG. 10 and FIG. 11, the stopper component 2 includes a stopper shell component. The stopper shell component includes an upper stopper shell 221 and a lower stopper shell 222. The snap-fit points 2211 are arranged on the upper stopper shell 221. The liquid guide channel 2221 and the air inlet channel 2222 are arranged on the lower stopper shell 222. As shown in FIG. 12 to FIG. 14, the stopper valve 21 and the stopper valve positioning component including a positioning piece 23 and a sealing gasket 26 are accommodated in the shell component. The stopper valve 21 is positioned above the stopper valve positioning component. The stopper valve positioning component is fixed relative to the stopper shell component. The stopper valve 21 is rotatable relative to the stopper valve positioning component. The stopper valve positioning component is provided with a liquid guide through hole 232 corresponding to the liquid guide channel 2221 and an air inlet through hole 231 corresponding to the air inlet channel 2222.

Figure 15:
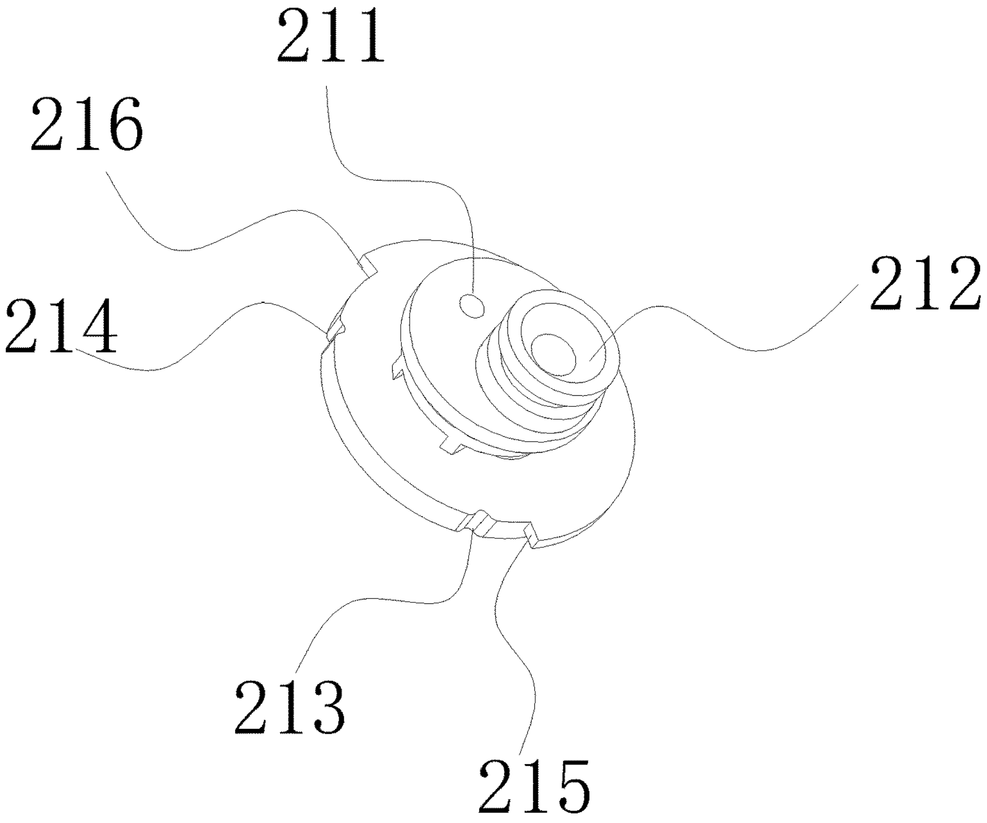
FIG. 15 is a three-dimensional view of a stopper valve according to an embodiment of the application.

As shown in FIG. 15, the upper part of the stopper valve 21 is provided with an air inlet hole 211 and a raised liquid guide hole 212. The stopper valve 21 is further provided with an OPEN positioning concave point 213, a CLOSE positioning concave point 214, an OPEN positioning plane 215 and a CLOSE positioning plane 216.

Figure 16:
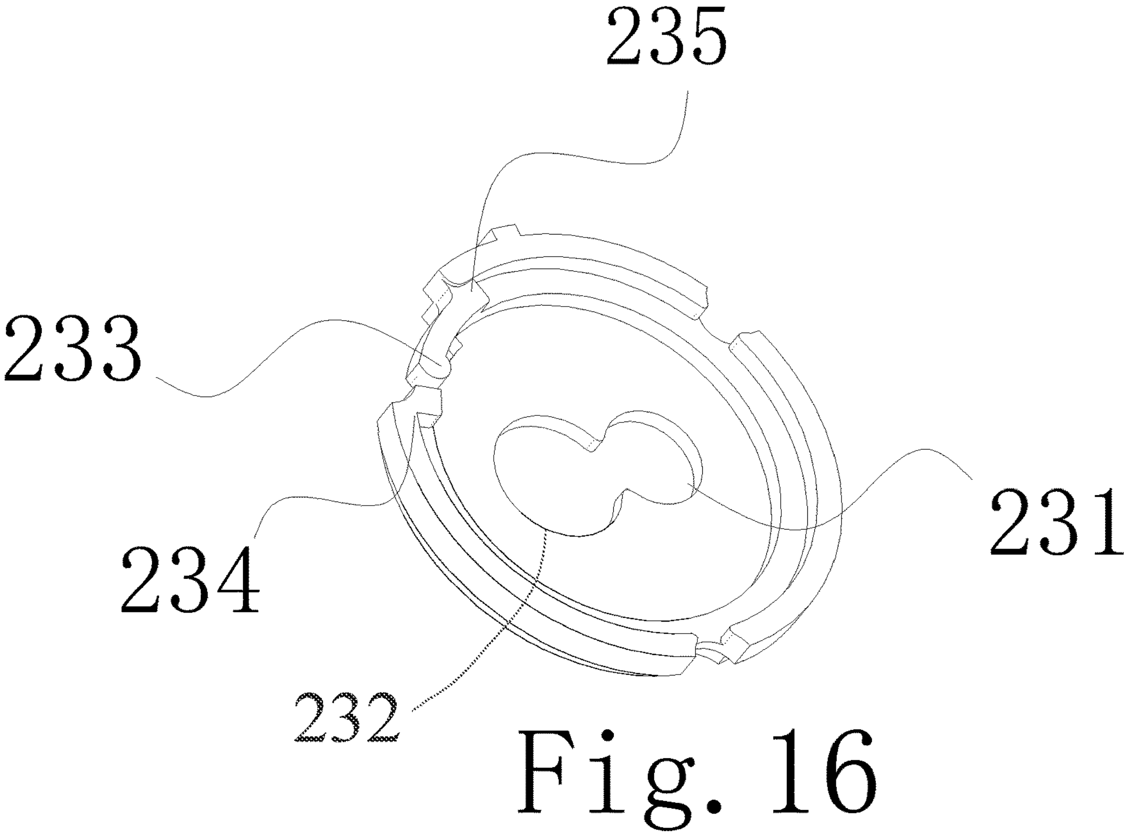
FIG. 16 is a three-dimensional view of a positioning piece according to an embodiment of the application.

As shown in FIG. 16, the positioning piece 23 is provided with a positioning through hole 231. An elastic rib 233, an OPEN contraposition plane 234 and a CLOSE contraposition plane 235 are further arranged inside the stopper valve positioning component.

Figure 17:
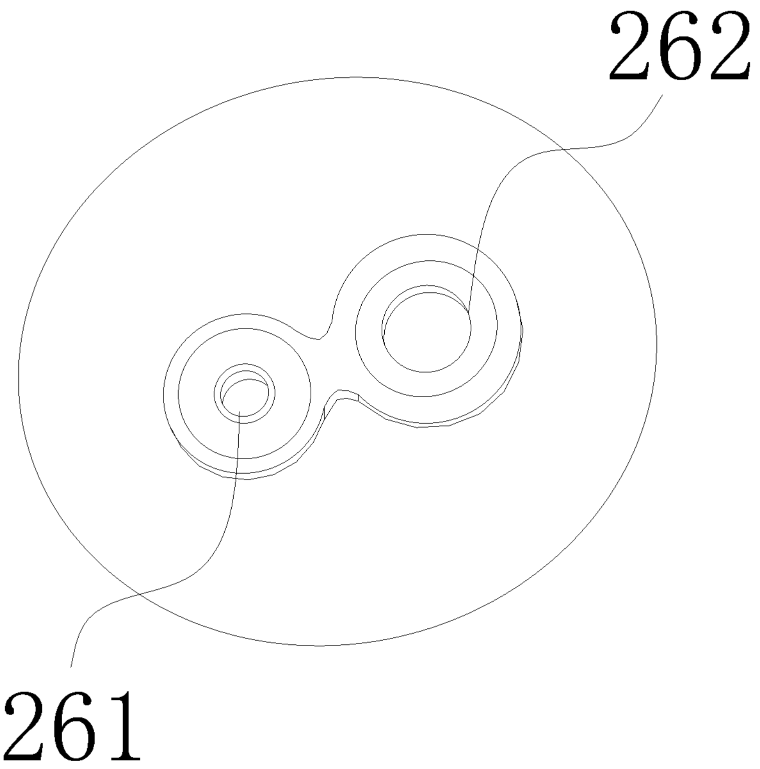
FIG. 17 is a front view of a sealing gasket according to an embodiment of the application.

As shown in FIG. 17, the sealing gasket 26 is provided with a liquid guide through hole 262 corresponding to the liquid guide channel 2221 and an air inlet through hole 261 corresponding to the air inlet channel 2222.

When the elastic rib 233 is accommodated in the OPEN positioning concave point 213, the OPEN contraposition plane 234 abuts against the OPEN positioning plane 215, the air inlet hole 211 and the air inlet through hole 231 communicate with each other, the liquid guide hole 212 and the liquid guide through hole 132 communicate with each other, and the stopper component is in an OPEN state. When the elastic rib 233 is accommodated in the CLOSE positioning concave point 214, the CLOSE contraposition plane 235 abuts against the CLOSE positioning plane 216, the air inlet hole 211 and the air inlet through hole 231 are staggered with each other, the liquid guide hole 212 and the liquid guide through hole 232 are staggered with each other, and the stopper component is in a CLOSE state. Whenever the elastic rib 233 cooperates with the OPEN positioning concave point 213 or the CLOSE positioning concave point 214, a "snap" tone will be sent out.

As shown in FIG. 12 and FIG. 13, the top of the liquid guide hole 212 is provided with a sealing ring 24. The outer wall of the liquid guide hole 212 is provided with a stopper valve sealing ring 25. The arrangement of the sealing ring 24, the stopper valve sealing ring 25 and the sealing gasket 26 ensures that the stopper component can realize air/liquid-tight sealing. The stopper component further includes a stopper sealing ring 210. The stopper sealing ring 210 is nested at the outer side of the liquid guide channel 2221 and the air inlet channel 2222. The stopper sealing ring enables the stopper component to remain sealed with the neck of the bottle when the stopper component is plugged into the neck of the bottle. As shown in FIG. 13 and FIG. 14, the stopper valve 21 is rotatable relative to the stopper valve positioning component, so that when the air inlet hole 211 and the air inlet through hole 231 are staggered with each other and the liquid guide hole 212 and the liquid guide through hole 232 are staggered with each other, the stopper component is in a CLOSE state.

As shown in FIG. 10, the stopper component further includes a long air guide tube 17. The long air guide tube 17 is detachably connected with the liquid guide channel 2221. The long guide tube 27 is further provided with a decanting tube 28. The decanting tube 28 is detachably connected with the long guide tube 27 and the liquid guide channel 2221. The side face of the decanting tube 28 is provided with an aerating hole 281.

As shown in FIG. 12, the stopper component further includes a stopper dust cover 29. The stopper dust cover 29 is detachably connected at the top of the upper stopper shell 221.

Finally, it should be noted that the embodiments disclosed by the application are merely preferred embodiments of the application, and are only used to illustrate the technical solutions of the application rather than forming limitations thereto. While the application is described in detail with reference to the preceding embodiments, those of ordinary skill in the art should understand that it is still possible to modify the technical solutions recorded in the preceding embodiments, or to make equivalent substitutions to part of the technical features therein. These modifications or substitutions do not make the essence of the corresponding technical solutions depart from the spirit and scope of the technical solutions of the embodiments of the application.

The invention claimed is:

1. A separate type electric wine dispenser and preserver, comprising a wine dispensing main unit and a stopper component; wherein a lower part of the wine dispensing main unit is provided with a connector, and a liquid guide chamber and an air guide chamber are arranged in the connector; an upper part of the stopper component is provided with a stopper valve, and an upper part of the stopper valve is provided with an air inlet hole and a liquid guide hole protruding out of the stopper valve; and the air inlet hole corresponds to the air guide chamber in position, and the liquid guide hole is inserted in the liquid guide chamber;

wherein an outer wall of the connector is provided with a connection groove, and the connection groove has a groove opening; and the stopper component is provided with snap-fit points, and the snap-fit points are inlaid into or detached from the connection groove through the groove opening.

2. The separate type electric wine dispenser and preserver according to claim 1, wherein the wine dispensing main unit further comprises a main unit shell component, a switch component, a circuit component, a pressurization component, a liquid outlet component and an air guide tube; the switch component is arranged on a surface of the main unit shell component; the circuit component, the pressurization component, the liquid outlet component and the air guide tube are arranged inside the main unit shell component; the switch component, the circuit component and the pressurization component are electrically connected; the pressurization component communicates with the air guide tube; an upper part of the connector is provided with a liquid guide port and an air guide port; one end of the liquid guide port is connected with the liquid outlet component, and an opposite end communicates with the liquid guide chamber; and one end of the air guide port is connected with the air guide tube, and an opposite end communicates with the air guide chamber.

3. The separate type electric wine dispenser and preserver according to claim 1, wherein the stopper component further comprises a stopper shell component and a stopper valve positioning component; the stopper shell component is further provided with a liquid guide channel and an air inlet channel; the stopper valve and the stopper valve positioning component are accommodated in the stopper shell component; the stopper valve is positioned above the stopper valve positioning component; the stopper valve positioning component is fixed relative to the stopper shell component; the stopper valve is rotatable relative to the stopper valve positioning component; and the stopper valve positioning component is provided with a liquid guide through hole corresponding to the liquid guide channel and an air inlet through hole corresponding to the air inlet channel.

4. The separate type electric wine dispenser and preserver according to claim 3, wherein the stopper shell component comprises an upper stopper shell and a lower stopper shell; the snap-fit points are arranged on the upper stopper shell; and the liquid guide channel and the air inlet channel are arranged on the lower stopper shell.

5. The separate type electric wine dispenser and preserver according to claim 3, wherein the stopper valve positioning component comprises a positioning piece and a sealing gasket; the positioning piece is provided with a positioning through hole; and the sealing gasket is provided with the liquid guide through hole and the air inlet through hole.

6. The separate type electric wine dispenser and preserver according to claim 5, wherein the stopper valve is provided with an OPEN positioning concave point, a CLOSE positioning concave point, an OPEN positioning plane and a CLOSE positioning plane; an elastic rib, an OPEN contraposition plane and a CLOSE contraposition plane are arranged inside the positioning piece; when the elastic rib is accommodated in the OPEN positioning concave point, the OPEN contraposition plane abuts against the OPEN positioning plane, the air inlet hole and the air inlet through hole communicate with each other, the liquid guide hole and the liquid guide through hole communicate with each other, and the stopper component is in an OPEN state; and when the elastic rib is accommodated in the CLOSE positioning concave point, the CLOSE contraposition plane abuts against the CLOSE positioning plane, the air inlet hole and the air inlet through hole are staggered with each other, the liquid guide hole and the liquid guide through hole are staggered with each other, and the stopper component is in a CLOSE state.

7. The separate type electric wine dispenser and preserver according to claim 3, wherein a top of the liquid guide hole is provided with a sealing ring; and the outer wall of the liquid guide hole is provided with a stopper valve sealing ring.

8. The separate type electric wine dispenser and preserver according to claim 3, wherein the stopper component further comprises a long guide tube; the long guide tube is detachably connected with the liquid guide channel; the long guide tube is further provided with a decanting tube; the decanting tube is detachably connected with the long guide tube and the liquid guide channel; and a side face of the decanting tube is provided with an aerating hole.

9. The separate type electric wine dispenser and preserver according to claim 3, wherein the wine dispensing main unit has a main unit dust cover; the main unit dust cover is detachably connected to a lower part of the wine dispensing main unit; the stopper component has a stopper dust cover; and the stopper dust cover is detachably connected to a top of the stopper shell component.

* * * * *